May 25, 1948.   D. E. DASHER   2,441,993
APPARATUS FOR TESTING FRICTION MATERIAL
Filed Dec. 5, 1945
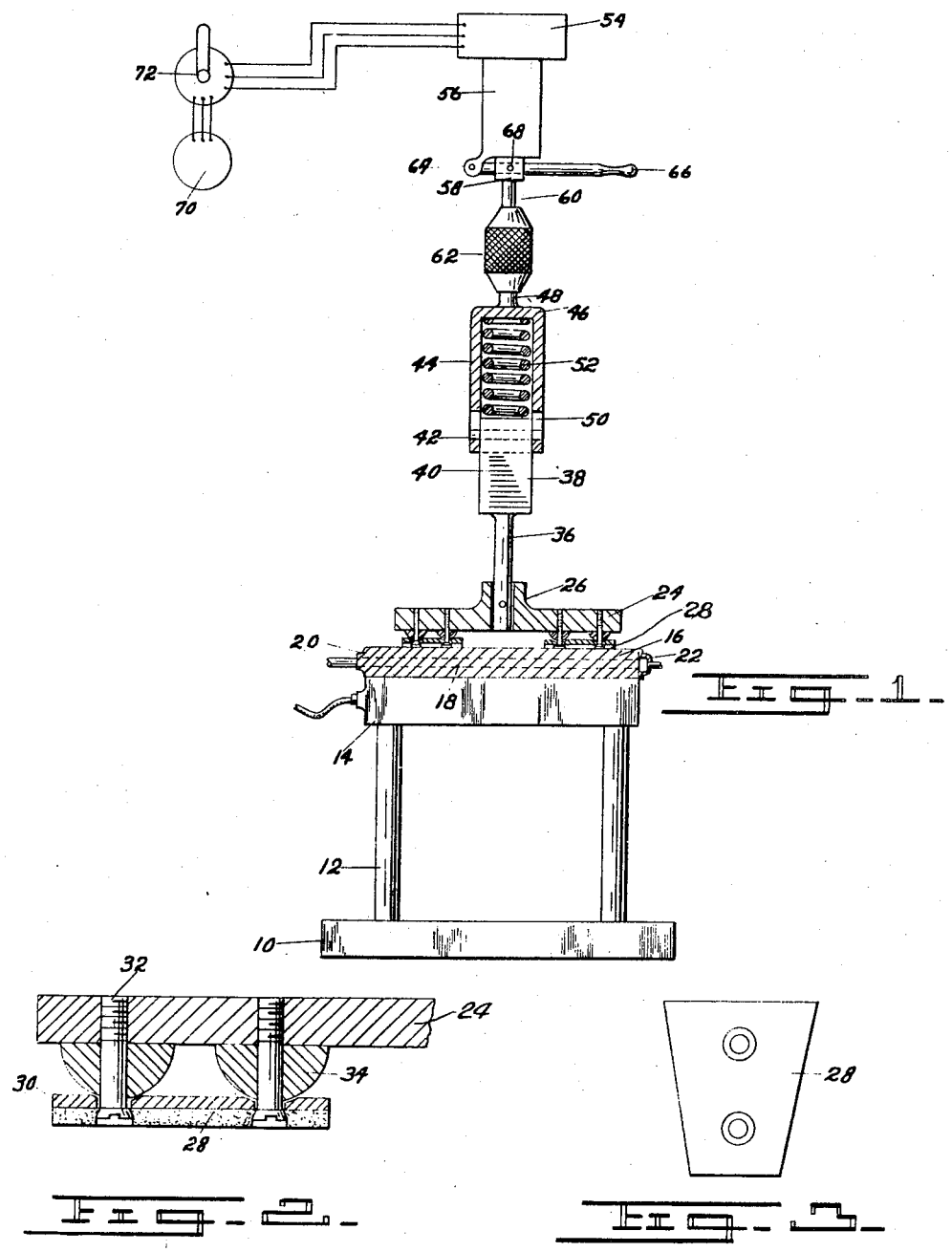
INVENTOR.
DON E. DASHER
BY
ATTORNEY Patented May 25, 1948

2,441,993

UNITED STATES PATENT OFFICE 2,441,993

APPARATUS FOR TESTING FRICTION MATERIAL

Don E. Dasher, Detroit, Mich., assignor to Bendix Aviation Corporation, Detroit, Mich., a corporation of Delaware Application December 5, 1945, Serial No. 633,015

3 Claims. (Cl. 73—7)

This invention relates to testing apparatus, and particularly to apparatus for testing the wearing and endurance qualities of friction materials.

Brake linings, clutch facings, and similar articles are tested in a variety of ways, but all test methods heretofore used are less than entirely satisfactory. Either they involve excessively expensive or complicated equipment and methods, or they are not sufficiently simulative of actual conditions encountered in practical use.

An object of the present invention is to provide an inexpensive and simple apparatus for carrying out a highly informative testing technique.

Other objects and features of this invention will appear hereinafter, or will suggest themselves to those skilled in the art in the following specification, reference being made also to the accompanying drawing illustrating one embodiment of the invention. It is to be understood, of course, that other embodiments are also embraced in the appended claims.

In the drawing:

Fig. 1 is a general assembly view;

Fig. 2 is an enlarged fragmentary view in section of a portion of the complete assembly; and Fig. 3 is a bottom plan view of one of the segments used for test purposes.

Referring to the drawings for more specific details of the invention 10 represents a base having thereon legs 12 supporting a plate 14 adapted to be electrically or otherwise heated, and superimposed on the plate 14 is a smooth surfaced steel cooling plate 16 having passages 18 extended therethrough.

Manifolds 20 and 22 suitably secured to the ends of the plate 16 serve to connect the passages 18 to one another and also to connect the passages to a suitable water supply and discharge, to the end that water may be circulated through the plate 16 so as to decrease heat generated in the plate 14.

A disc 24 having a hub 26 has mounted thereon blocks or segments 28 of friction material to be tested. The blocks or segments are of such a character as are commonly employed for application to the rotating parts of wheel assemblies on aircraft landing gear to produce a braking action as the craft makes engagement with and rolls along the ground as upon landing of the aircraft.

As shown, the segments 28 of friction material are supported on a disc 30 as by screws or other suitable means 32 passed through openings in the friction material and disc 30 with small clearance and secured in the disc 24 with semi-spherical members 34 interposed between the discs, so as to provide for slight rocking movement of the disc 30.

A spindle 36 suitably secured in the hub 26 of the disc 24 has an enlarged portion 38 calibrated in pounds as indicated at 40 and in the upper end of the enlarged portion is a diametral pin 42. A sleeve 44 fitted for reciprocation on the enlarged portion 38 has one end closed as by a head 46 supporting a concentrically disposed spindle 48.

The sleeve 44 is slotted as at 50 for the reception of the pin 42 and a spring 52 is positioned in the sleeve between the enlarged portion 38 of the spindle 36 and the head 46 of the sleeve 44. Pressure applied through the spindle 48 results in movement of the sleeve on the enlarged portion 38 of the spindle 36 against the resistance of the spring 52 and as the lower end of the sleeve moves over the calibrations 40 a visual indication is had of the pounds of pressure applied, and this pressure is transmitted through the rotatable disc 24 to the parts under test against the plate 16.

The driving assembly includes an electric motor 54 having its armature shaft enclosed in a housing 56 and suitably connected to a reciprocable extension 58 carrying a spindle 60 having thereon a chuck 62 for the reception of the spindle 48, and a bracket 64 on the housing 56 has pivoted thereto a hand lever 66 connected as by a pin 68 to the reciprocable extension 58 of the armature shaft.

By applying force to the hand lever 66 controlled pressure may be transmitted through the armature shaft extension 58, the spindle 60 carried thereby, and the chuck 62 to the spindle 48, thence through sleeve 44, the spring 52 and spindle 36 to the disc 24 carrying the parts under test.

A suitable source of current 70 supplies the operating power to the motor 56, and a meter 72 is inserted in the conductive leads from the source of current 70 to the motor 56 in order to measure the current consumption under varying conditions throughout the duration of the test to which the segments 28 are being subjected. This current consumption indication constitutes one means of determining the physical characteristics of the parts under test, that is, the wearing of the segments and endurance qualities thereof. If the consumption of current is high it indicates that the material under test has a high coefficient of friction, and conversely if the consumption of current is low it indicates that material has a low coefficient of friction.

In conducting a test of the frictional material constituting the segments 28 heat is applied through the plate 14 in any desired amount, preferably corresponding to the amount of heat which would be generated in actual use of the segments 28 in whatever application it may be made thereof. In instances where the amount of heat is increased to an extent where the consumption of current decreases it indicates fade or a change in the physical characteristics of the segments under test.

The pressure applied is a determining factor in the wear of segments; such pressure, however, should not be in excess of that normally applied to retard the rotating parts of the wheel assemblies to which the segments are applied, and the wearing quality of the segments is determined by comparative measurements of the thickness of the segments before and after the test.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. An apparatus for testing the physical characteristics of friction material comprising a stationary member having a smooth surface, means for heating the member, means for cooling the member, a rotatable support for the material under test associated with the member, means for applying pressure through the rotatable support for pressing the material under test against the smooth surface of the member during rotation thereof, electrical means for driving the rotatable support, and a meter for measuring the electric current consumed by the electric driving means.

2. An apparatus for testing the physical characteristics of friction material comprising a stationary member having a smooth surface, means for heating the stationary member, means for cooling the stationary member, a rotatable member for cooperation with the stationary member, means on the rotatable member for supporting the material under test in engagement with the stationary member, means for applying pressure on the rotatable member, electrically driven means for driving the rotatable member and a meter for measuring the current consumed by the electrically driven means when driving the rotatable member.

3. An apparatus for testing the physical characteristics of friction material comprising a stationary member having a smooth engaging surface, means for controlling the temperature of the engaging surface, a rotatable member for cooperation with the stationary member including automatically adjustable means for supporting the material under test in a uniform engagement with the engaging surface, manually operated calibrated means for controlling contact pressures between the friction material and the engaging surface, electrically driven means for driving the rotatable member, and means for indicating the power consumption of the driving means.

DON E. DASHER.

REFERENCES CITED

The following references are of record in the file of this patent:

UNITED STATES PATENTS

| Number | Name | Date |
|---|---|---|
| 1,490,603 | Elverson | Apr. 15, 1924 |
| 1,960,226 | Schoenberg | Mar. 22, 1934 |
| 2,005,521 | Harrington | June 18, 1935 |
| 2,033,588 | Piggott et al. | Mar. 10, 1936 |
| 2,237,743 | McIntyre | Apr. 8, 1941 |
| 2,269,305 | Bell | Jan. 6, 1942 |